(12) United States Patent
Kunkel

(10) Patent No.: US 8,955,857 B1
(45) Date of Patent: Feb. 17, 2015

(54) CARCASS TRANSPORTATION CART

(71) Applicant: Joseph D. Kunkel, Hinton, IA (US)

(72) Inventor: Joseph D. Kunkel, Hinton, IA (US)

( * ) Notice: Subject to any disclaimer, the term of this patent is extended or adjusted under 35 U.S.C. 154(b) by 0 days.

(21) Appl. No.: 14/298,197

(22) Filed: Jun. 6, 2014

(51) Int. Cl.
*B62B 3/08* (2006.01)
*B62B 3/10* (2006.01)
*B62B 3/00* (2006.01)

(52) U.S. Cl.
CPC ............... *B62B 3/104* (2013.01); *B62B 3/001* (2013.01)
USPC ..................................... 280/79.7; 280/47.34

(58) Field of Classification Search
USPC ............... 280/79.7, 87.01, 640, 47.34; 298/3
See application file for complete search history.

(56) References Cited

U.S. PATENT DOCUMENTS

| | | | | |
|---|---|---|---|---|
| 2,979,338 A * | 4/1961 | Dwyer | .......................... | 280/47.3 |
| 3,222,100 A * | 12/1965 | Lindzy | ............................. | 296/20 |
| 3,820,807 A * | 6/1974 | Curran | .......................... | 280/47.3 |
| 3,907,323 A * | 9/1975 | Knapp et al. | ................. | 280/47.3 |
| 4,052,080 A * | 10/1977 | Hedderich et al. | ......... | 280/47.26 |
| 4,063,744 A * | 12/1977 | Fraser | ............................. | 280/42 |
| 4,215,877 A * | 8/1980 | Pritchett | ....................... | 280/652 |
| 4,362,309 A * | 12/1982 | Stamper | ..................... | 280/47.19 |
| 4,413,834 A * | 11/1983 | Base | .......................... | 280/47.26 |
| 4,435,115 A | 3/1984 | Orstad et al. | | |
| 4,469,341 A * | 9/1984 | Creim | ........................ | 280/47.26 |
| 4,630,838 A * | 12/1986 | Stockton | .................... | 280/47.17 |
| 4,789,180 A * | 12/1988 | Bell | ............................. | 280/652 |
| 4,796,909 A * | 1/1989 | Kirkendall | ..................... | 280/651 |
| 4,953,886 A * | 9/1990 | Grant | ............................. | 280/640 |
| 4,958,846 A * | 9/1990 | Greenberg | ..................... | 280/652 |
| 5,090,368 A * | 2/1992 | Berghoefer | ..................... | 119/843 |
| 5,330,212 A * | 7/1994 | Gardner | ......................... | 280/40 |
| 5,529,323 A * | 6/1996 | vom Braucke et al. | ..... | 280/87.01 |
| 5,620,193 A * | 4/1997 | Dschaak | ..................... | 280/47.31 |
| 5,645,292 A * | 7/1997 | McWilliams et al. | ......... | 280/494 |
| 5,687,978 A * | 11/1997 | Rhodes et al. | .................. | 280/30 |
| 5,772,222 A * | 6/1998 | Sim et al. | ........................ | 280/30 |
| 6,022,032 A * | 2/2000 | Savage | ......................... | 280/47.24 |
| 6,139,029 A * | 10/2000 | Shaw | .............................. | 280/8 |
| 6,260,864 B1 * | 7/2001 | Smith | ........................... | 280/47.26 |
| 6,283,496 B1 * | 9/2001 | Dickmann | .................... | 280/652 |
| 6,604,749 B2 | 8/2003 | Woodbury | | |
| 6,688,635 B1 * | 2/2004 | Watts | ............................ | 280/652 |
| 6,811,179 B2 * | 11/2004 | Woods | .......................... | 280/652 |
| 7,017,940 B2 * | 3/2006 | Hatfull | .......................... | 280/652 |
| 7,210,590 B2 | 5/2007 | Labrecque et al. | | |
| 7,896,367 B1 * | 3/2011 | Suprono | .................... | 280/47.15 |
| 8,141,887 B1 * | 3/2012 | Poteat | ......................... | 280/47.24 |
| 8,366,125 B2 * | 2/2013 | Loomans | ................... | 280/47.17 |
| 8,757,639 B2 * | 6/2014 | Graffis | ............................. | 280/30 |
| 2007/0031206 A1 * | 2/2007 | Kreager | ......................... | 410/51 |

OTHER PUBLICATIONS

Fenner Farm Services, Hercules' Arm Sr. Model, www.pennerfarmservice.com, date unknown.
Vittetoe, Inc., Dead Hog Mover Cart & Feed Chore Cart, www.vittetoe.com, date unknown.
Farmer Boy AG, Dead Sled Mover, www.farmerboyag.com, date unknown.

* cited by examiner

*Primary Examiner* — Jeffrey J Restifo
(74) *Attorney, Agent, or Firm* — Dennis L. Thomte; Thomte Patent Law Office LLC

(57) ABSTRACT

A carcass transportation cart is provided for moving a dead pig from a confinement area to a disposal location.

2 Claims, 7 Drawing Sheets

US 8,955,857 B1

CARCASS TRANSPORTATION CART

BACKGROUND OF THE INVENTION

1. Field of the Invention

This invention relates to a carcass transportation cart and more particularly to a dead pig cart. Even more particularly, the invention relates to a dead pig cart which enables a dead pig to be removed from a pig confinement area.

2. Description of the Related Art

Pigs sometimes die in confinement areas which requires the carcass thereof to be removed from the confinement area. Many types of dead pig movers have been previously provided to enable a dead pig to be removed from the confinement area to a disposal location. Most of the prior art dead pig movers are extremely expensive and are ill-equipped to enable the removal of the dead pig from the confinement area due to the narrow alleyways in the confinement area. Additionally, the prior art dead pig movers are cumbersome to use.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A carcass transportation cart, and more particularly a dead pig cart, is disclosed. The cart includes a cradle having a forward end, a rearward end, a first side and a second side. The cradle includes a horizontally disposed first cradle member which has a forward end, a rearward end, a first side and a second side. A second cradle member, having upper and lower ends, extends upwardly and outwardly from the first side of the first cradle member. A third cradle member, having upper and lower ends, extends upwardly from the upper end of the second cradle member. A fourth cradle member, having upper and lower ends, extends upwardly from the second side of the first cradle member. A fifth cradle member, having upper and lower ends, extends upwardly from the upper end of the fourth cradle member.

An elongated axle, having first and second ends, is operatively secured to the first cradle member so as to be positioned below the first cradle member forwardly of the rearward end thereof. The first end of the axle is positioned at the first side of the first cradle member and the second end of the axle is positioned at the second side of the first cradle member. A first wheel is rotatably mounted on the first end of the axle and a second wheel is rotatably mounted on the second end of the axle. A pull wheel support, having forward and rearward ends, has its rearward end secured to the first cradle member so that the forward end of the pull wheel support is positioned forwardly of the forward end of the first cradle member. A pair of steerable pull wheels are operatively pivotally secured to the forward end of the pull wheel support about a vertical axis. An elongated pull handle, having upper and lower ends, has its lower end operatively pivotally secured to the pair of steerable pull wheels about a horizontal axis. An upstanding leverage handle, having upper and lower ends, is secured to the fifth cradle member so as to extend upwardly therefrom. In the preferred embodiment, the leverage handle has a generally inverted U-shape. In the preferred embodiment, the third cradle member has a generally U-shaped opening formed therein.

A modified form of the cart is also disclosed wherein the leverage handle is secured to the third cradle member so as to extend upwardly therefrom. The cart which has the leverage handle secured to the third cradle member is designed for smaller pigs while the cart wherein the leverage handle is secured to the fifth cradle member is designed for larger pigs.

It is therefore a principal object of the invention to provide an improved carcass transportation cart.

A further object of the invention is to provide a carcass transportation cart which enables a dead pig to be removed from the confines of a confinement area.

A further object of the invention is to provide a cart of the type described which has a narrow width so as to be able to move through alleyways in a confinement area.

A further object of the invention is to provide a cart of the type described which is convenient to use.

A further object of the invention is to provide a cart of the type described which enables large dead pigs to be easily removed from a confinement area.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
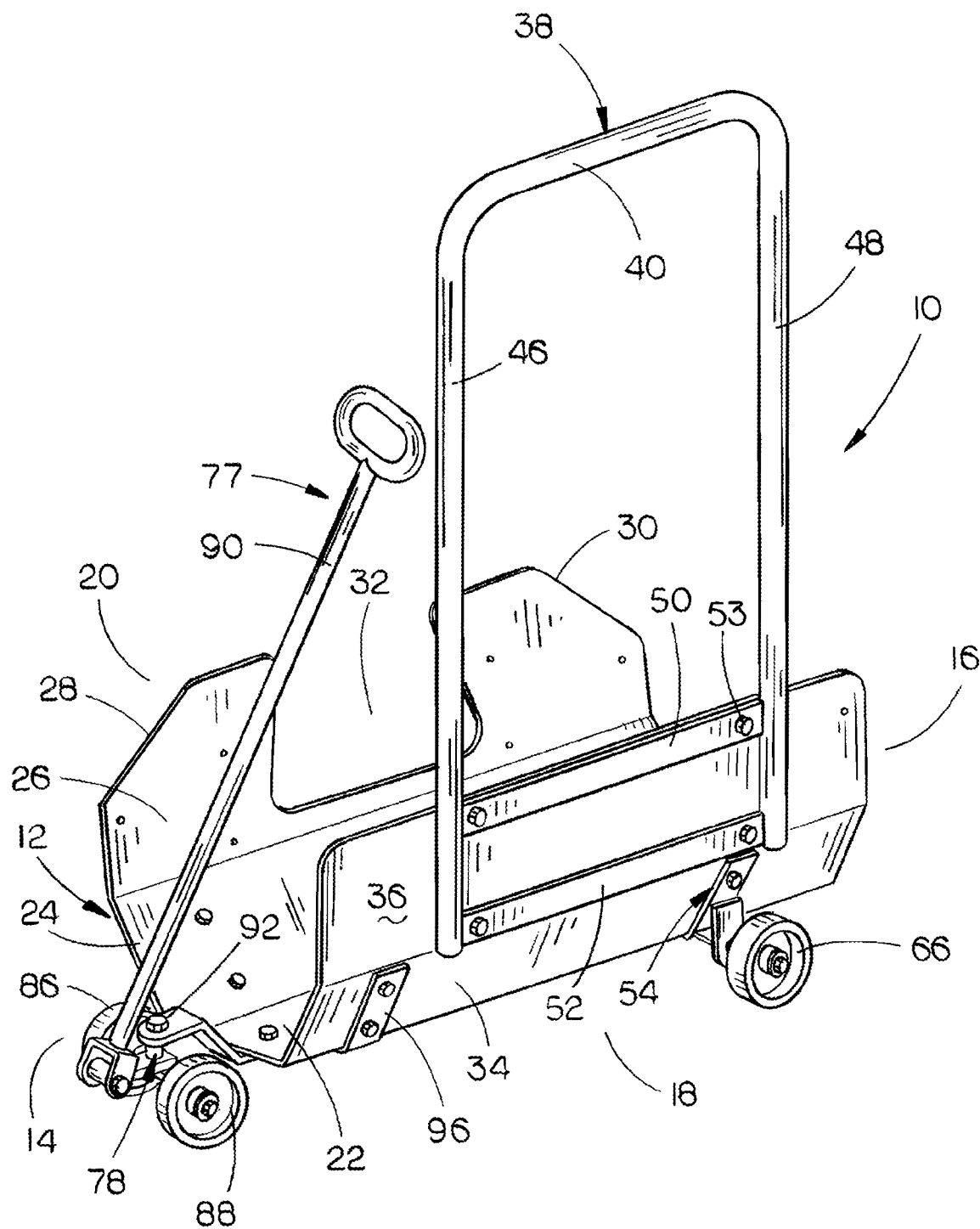
FIG. 1 is a front perspective view of the carcass transportation cart of this invention.
Figure 2:
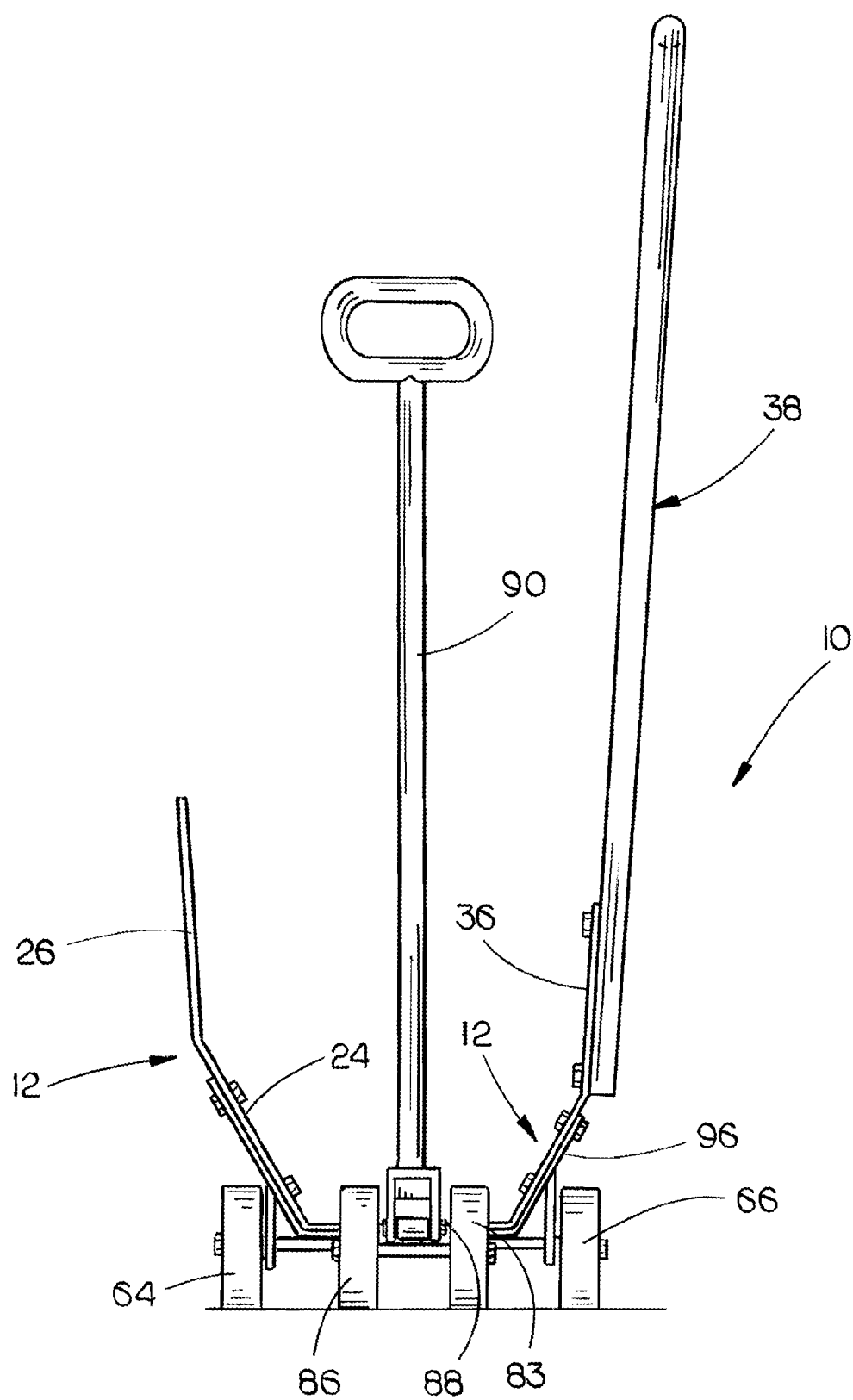
FIG. 2 is a front view of the carcass transportation cart of this invention.
Figure 3:
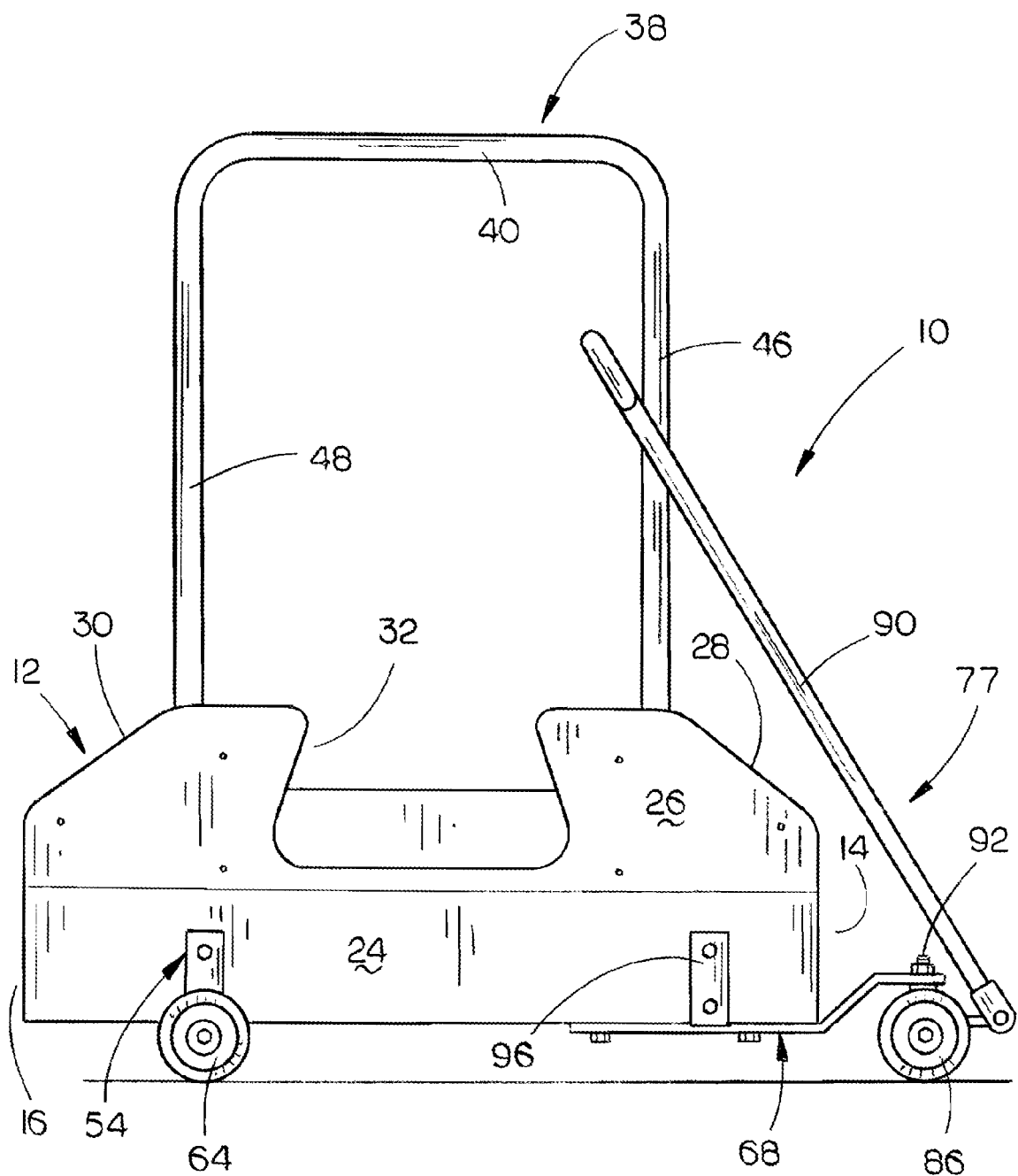
FIG. 3 is a side view of the carcass transportation cart of this invention.
Figure 4:
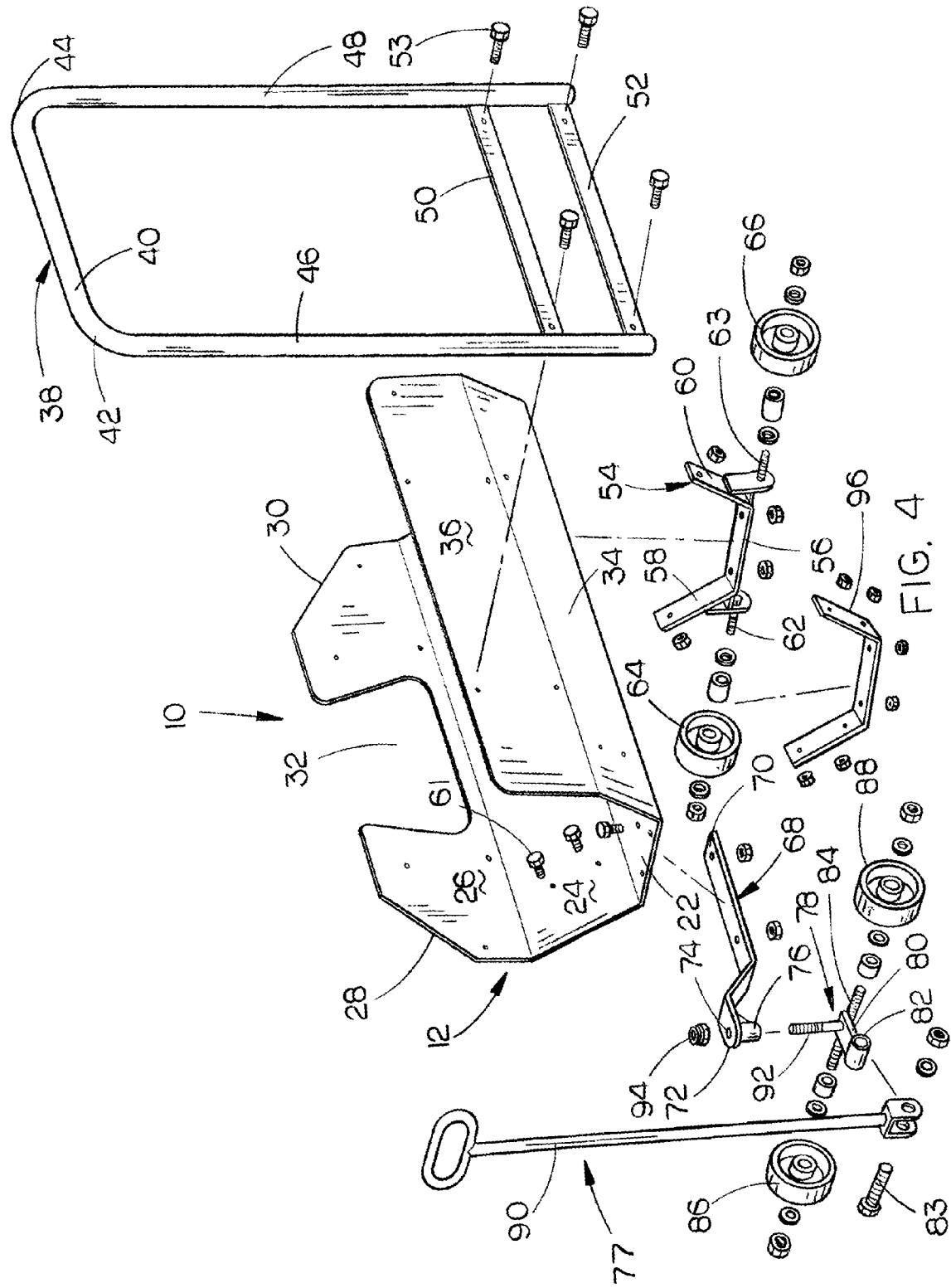
FIG. 4 is an exploded perspective view of the carcass transportation cart of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The carcass transportation cart of this invention is referred to by the reference numeral 10. The cart 10 is designed to haul, move or transport dead pigs from a confinement area although cart 10 could be used to haul, move or transport other dead animals such as sheep, goats, etc. Cart 10 includes a metal cradle 12 having a forward end 14, a rearward end 16, a first side 18 and a second side 20. Cradle 12 includes a horizontally disposed first cradle member 22. A second cradle member 24 extends upwardly and outwardly from one side of first cradle member 22. A third cradle member 26 extends upwardly from the upper end of cradle member 24 and has a tapered forward end 28 and a tapered rearward end 30. Cradle member 26 has an opening 32 formed therein intermediate the forward and rearward ends thereof. A fourth cradle member 34 extends upwardly and outwardly from the other side of cradle member 22 as seen in the drawings. A fifth cradle member 36 extends upwardly from cradle member 34 as also seen in the drawings. As seen, cradle member 26 is vertically disposed and cradle member 26 is substantially vertically disposed.

The numeral 38 refers to a pry or leverage handle which generally has a generally inverted U-shape. Handle 38 includes a horizontally disposed upper handle portion 40 having a forward end 42 and a rearward end 44. Front handle portion 46 extends downwardly from forward end 42 of leverage handle 38 and a rear handle portion 48 extends downwardly from the rearward end 44 of leverage handle 38.

A horizontally disposed brace 50 is secured to and extends between front handle portion 46 and rear handle portion 48 above the lower ends of handle portions 46 and 48. A horizontally disposed brace 52 is secured to and extends between front handle portion 46 and rear handle portion 48 at the lower ends of front handle portion 46 and rear handle portion 48. Braces 50 and 52 are secured to the cradle member 36 by screws or bolts 53 so as to be positioned at the outer side of cradle member 36.

The number 54 refers to a generally U-shaped axle support which includes a base portion 56 and legs 58 and 60 extending upwardly and outwardly from the outer ends of base portion 56. Axle support 54 is positioned at the underside of cradle 12 as seen in the drawings. Base portion 54, leg 58 and leg 60 are secured to bottom cradle member 22, cradle member 24 and cradle member 34 by bolts 61. Axles 62 and 63 are secured to axle support 54 and have wheels 64 and 66 rotatably secured thereto respectively.

The numeral 68 refers to a mounting plate or weldment having a rear portion 70 and an elevated front portion 72. Front portion 72 of mounting plate 68 has an opening 74 formed therein. Tube 76 has its upper end welded to the underside of front portion 72 of plate 68 so that it registers with opening 74.

The numeral 77 refers to a pull handle assembly. The numeral 78 refers to a pull handle wheel support. Support 78 includes a horizontally disposed plate 80 having a transversely extending tube 82 welded to the forward end thereof. An axle 84 is secured to plate 80 and has wheels 86 and 88 rotatably mounted on the outer ends thereof. A pull handle 90 has its lower end pivotally secured to tube 82 by bolt or pin 83. A pivot shaft 92 extends upwardly from the rearward end of plate 80. The upper end of shaft 92 is rotatably received in tube 76 and is secured therein by a nut 94 or the like. The numeral 96 refers to a generally U-shaped cradle support which is bolted to the underside of cradle 12.

Figure 5:
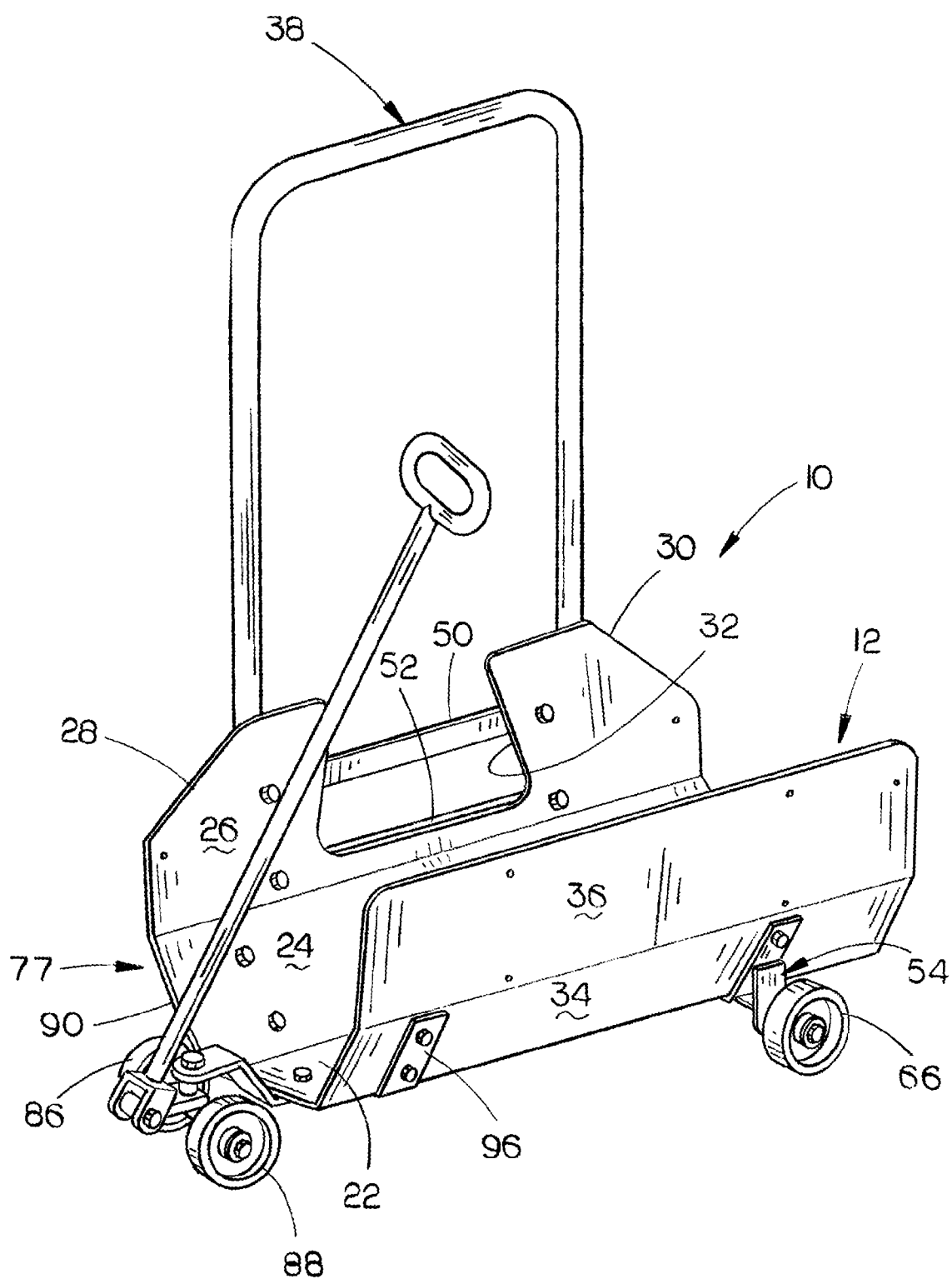
FIG. 5 is a perspective view of a modified form of the carcass transportation cart of this invention.

FIG. 5 illustrates a second embodiment of the carcass transportation cart of this invention. The only difference between the cart 10 of FIGS. 1-4 and the cart in FIG. 5 is that the leverage handle 38 is secured to cradle member 26 rather than cradle member 36. The cart 10 of FIGS. 1-4 is designed for larger pigs with the cart 10 of FIG. 5 designed for smaller pigs.

Figure 6:
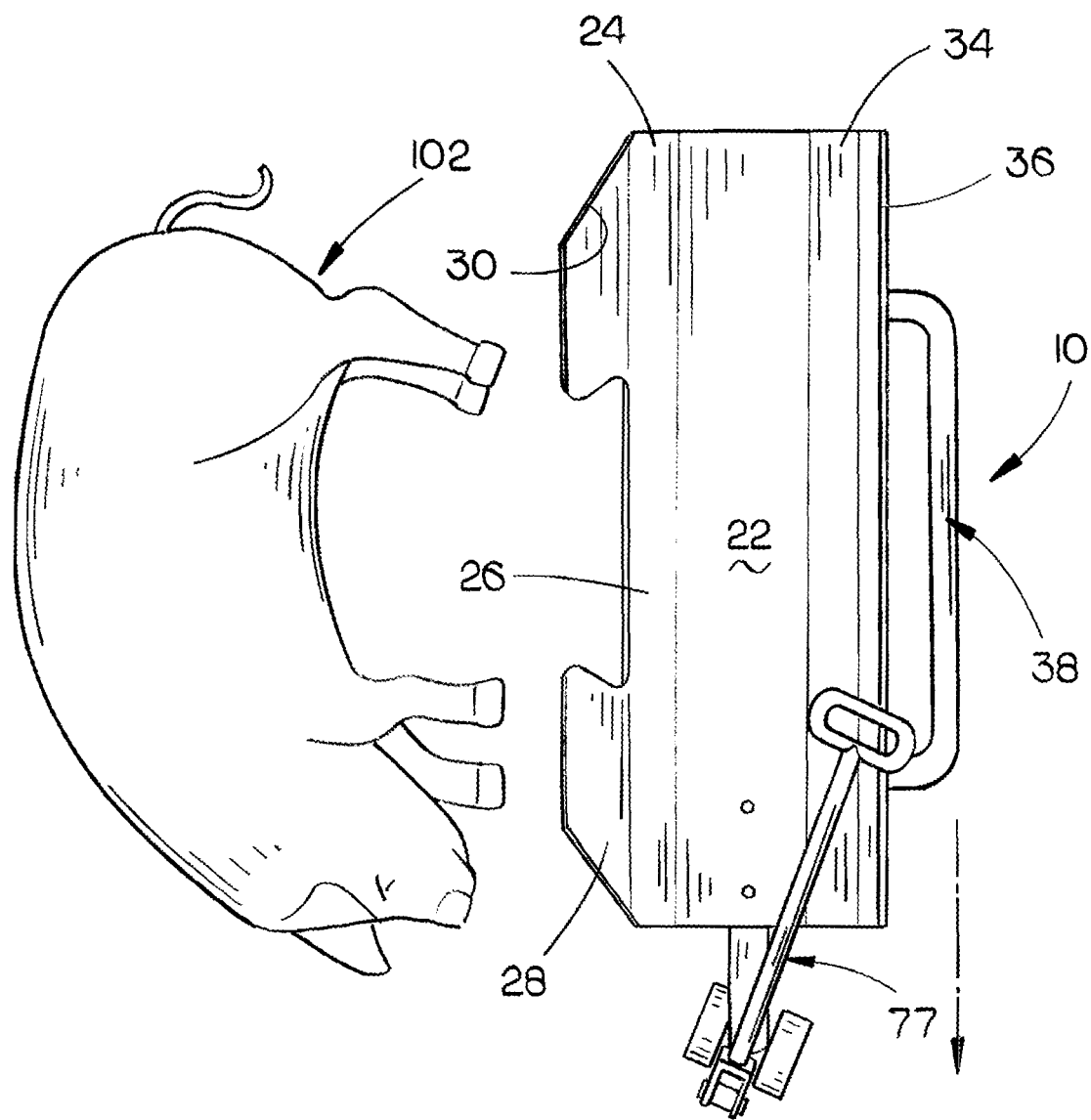
FIG. 6 is a top view illustrating the manner in which the carcass transportation cart is initially positioned adjacent the carcass of a pig.
Figure 7:
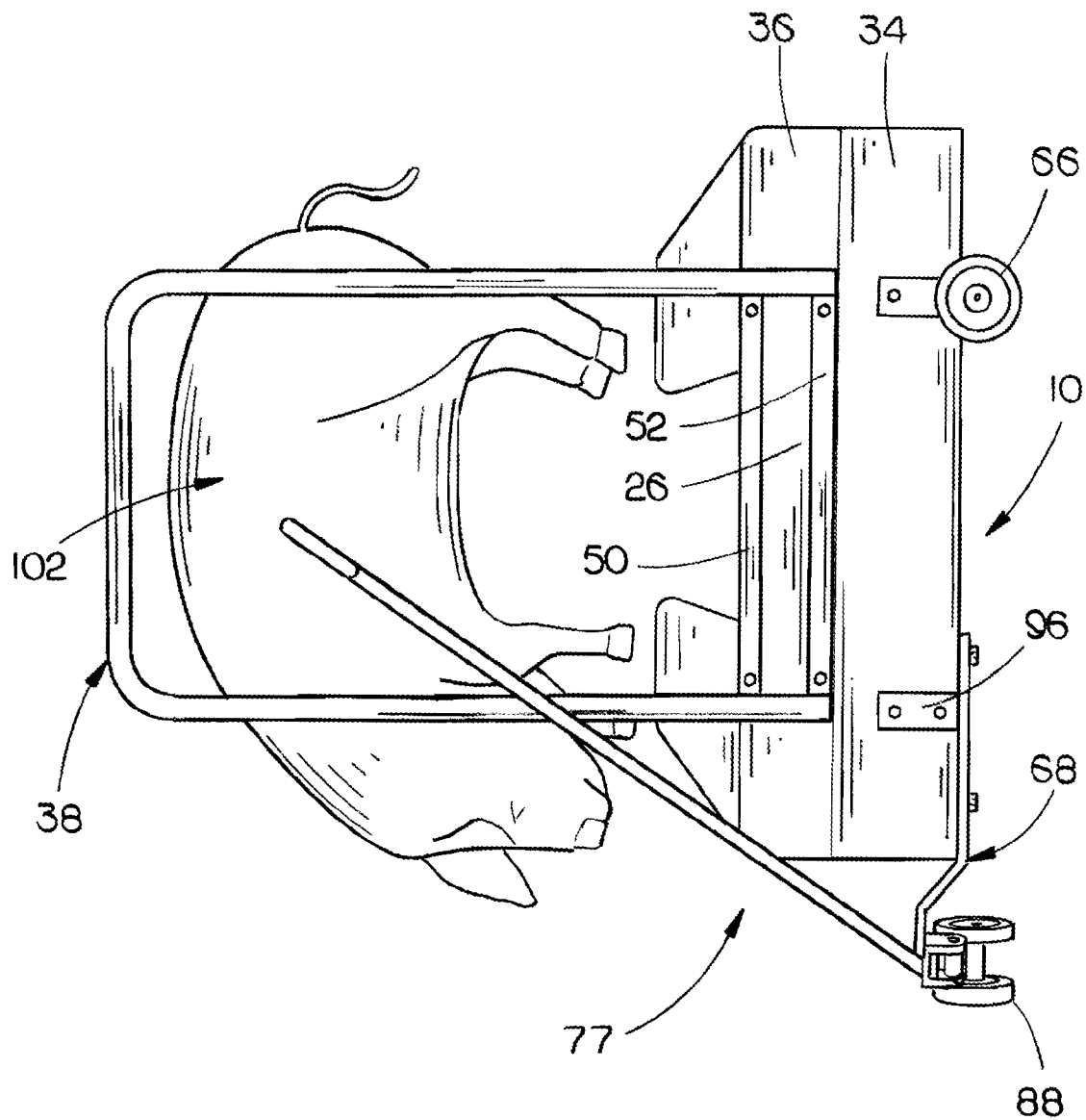
FIG. 7 is a view similar to FIG. 6 except that the transportation cart of this invention has been laid on its side so that the cradle may be slipped beneath the carcass of the pig.

The cart 10 is designed to be used to remove the carcass of a pig 102 from a confinement area as will now be described. Assuming that the pig 102 is resting on its right side, as seen in FIG. 6, the person removing the pig 102 will pull the cart 10 with the pull handle 90 so that the cart 10 is positioned with respect to the pig 102 as seen in FIG. 6. The person then steps across the pig's head and swings the pull handle 90 into the leveraging handle 38 (FIG. 6) while rolling the cart 10 onto its side with the leveraging handle 38 and the pull handle 90 until the cradle member 26 is positioned on the floor of the confinement area (FIG. 7). The person then pulls the cart 10 towards the pig 102 so that the cradle member 26 slides beneath the pig 102. During this maneuver, the person will have one hand on the pull handle 90 and will have one hand on the leveraging handle 38. As the cart is pulled towards the person, the person will scoop up the pig by rotating the cart 10 to its normal transport position. The opening 32 in cradle member 26 is provided to accommodate the belly of a large pig. The cart shown in FIG. 5 will be used with smaller carcasses. The person then pulls the cart 10 with the pig 102 thereon to a disposal location. The cart 10 is easily pulled through the narrow alleyways normally found in a confinement area.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A carcass transportation cart, comprising:
   a cradle having a forward end, a rearward end, a first side and a second side;
   said cradle including:
   a. a horizontally disposed first cradle member having a forward end, a rearward end, a first side and a second side;
   b. a second cradle member, having upper and lower ends, extending upwardly and outwardly from said first side of said first cradle member;
   c. a third cradle member, having upper and lower ends, extending upwardly from said upper end of said second cradle member;
   d. a fourth cradle member, having upper and lower ends, extending upwardly from said second side of said first cradle member; and
   e. a fifth cradle member, having upper and lower ends, extending upwardly from said upper end of said fourth cradle member;
   an elongated axle having first and second ends;
   said axle being operatively secured to said first cradle member so as to be positioned below said first cradle member forwardly of said rearward end thereof with said first end of said axle being positioned at said first side of said first cradle member and with said second end of said axle being positioned at said second side of said first cradle member;
   a first wheel rotatably mounted on said first end of said axle;
   a second wheel rotatably mounted on said second end of said axle;
   a pull wheel support having forward and rearward ends;
   said rearward end of said pull wheel support being secured to said first cradle member so that said forward end of said pull wheel support is positioned forwardly of said forward end of said first cradle member;
   a pair of steerable pull wheels operative pivotally secured to said forward end of said pull wheel support about a vertical axis;

an elongated pull handle having first and second ends;
said first end of said pull handle being operatively pivotally secured to said pair of steerable pull wheels about a horizontal axis;
and an upstanding leverage handle, having upper and lower ends, secured to said third cradle member so as to extend upwardly therefrom;
said leverage handle having a generally inverted U-shape;
said third cradle member having a generally U-shaped opening formed therein.

2. A carcass transportation cart, comprising:

a cradle having a forward end, a rearward end, a first side and a second side;

said cradle including:
- a. a horizontally disposed first cradle member having a forward end, a rearward end, a first side and a second side;
- b. a second cradle member, having upper and lower ends, extending upwardly and outwardly from said first side of said first cradle member;
- c. a third cradle member, having upper and lower ends, extending upwardly from said upper end of said second cradle member;
- d. a fourth cradle member, having upper and lower ends, extending upwardly from said second side of said first cradle member; and
- e. a fifth cradle member, having upper and lower ends, extending upwardly from said upper end of said fourth cradle member;

an elongated axle having first and second ends;
said axle being operatively secured to said first cradle member so as to be positioned below said first cradle member forwardly of said rearward end thereof with said first end of said axle being positioned at said first side of said first cradle member and with said second end of said axle being positioned at said second side of said first cradle member;
a first wheel rotatably mounted on said first end of said axle;
a second wheel rotatably mounted on said second end of said axle;
a pull wheel support having forward and rearward ends;
said rearward end of said pull wheel support being secured to said first cradle member so that said forward end of said pull wheel support is positioned forwardly of said forward end of said first cradle member;
a pair of steerable pull wheels operative pivotally secured to said forward end of said pull wheel support about a vertical axis;
an elongated pull handle having first and second ends;
said first end of said pull handle being operatively pivotally secured to said pair of steerable pull wheels about a horizontal axis;
an upstanding leverage handle, having upper and lower ends, secured to said fifth cradle member so as to extend upwardly therefrom;
said third cradle member having a generally U-shaped opening formed therein.

* * * * *